Jan. 17, 1928.

A. SWING 1,656,452

APPARATUS FOR TESTING SAW BLADES

Filed Jan. 26, 1924　　　2 Sheets-Sheet 1

INVENTOR
Alfred Swing
BY
ATTORNEY

Jan. 17, 1928.

A. SWING 1,656,452

APPARATUS FOR TESTING SAW BLADES

Filed Jan. 26, 1924

2 Sheets-Sheet 2

INVENTOR
Alfred Swing
BY
ATTORNEY

Patented Jan. 17, 1928.

1,656,452

UNITED STATES PATENT OFFICE.

ALFRED SWING, OF EAST ORANGE, NEW JERSEY, ASSIGNOR, BY MESNE ASSIGNMENTS, TO FEDERATED ENGINEERS DEVELOPMENT CORPORATION, A CORPORATION OF DELAWARE.

APPARATUS FOR TESTING SAW BLADES.

Application filed January 26, 1924. Serial No. 688,765.

This invention relates to improvements in apparatus for testing saw blades, particularly to apparatus for magnetically detecting defects in the blades before the blades are finished. In the manufacture of saws, there is considerable time and labor expended in producing the finished blade from a stamping, only to discover that the finished blade is faulty, usually caused by a crack in the toothed edge of the blade. Most of these flaws are too slight to be visibly detected prior to the time that the blade has been finished, and polished, and it is an object of the present invention to provide means for magnetically detecting flaws in the blades as soon as the blades are blanked out, and thus permit defective blades to be discarded before the finishing operations have been performed.

It is a further object of the invention to provide means for testing the blades which will in no way injure or strain good blades.

It is a further object of the invention to provide testing means which may be used by an unskilled operative. It is a further object to provide testing means which will be unlikely to get out of order, which will be simple and practical in construction, durable and efficient in use, and comparatively inexpensive to manufacture.

With these and other objects in view, the invention consists in certain novel features of construction and combinations and arrangements of parts as will be more fully hereinafter described and pointed out in the claims.

Figure 1:
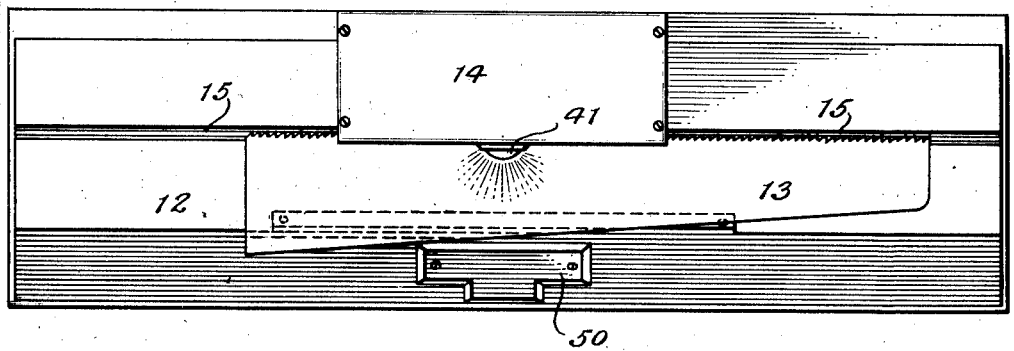
Figure 2:
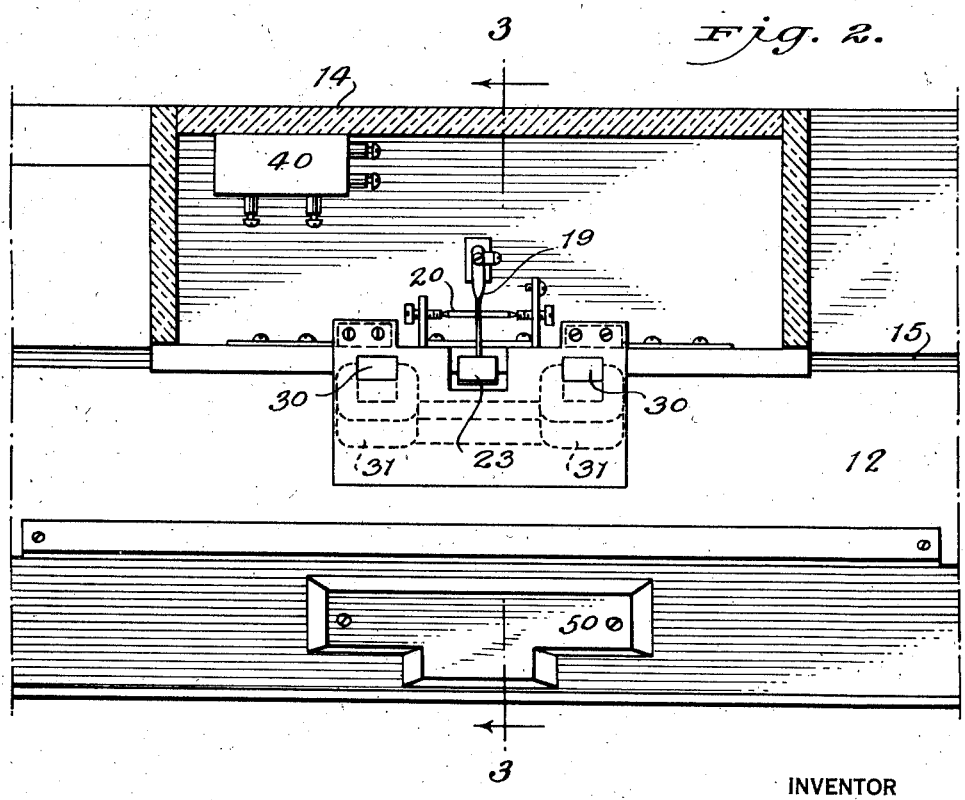
Figure 3:
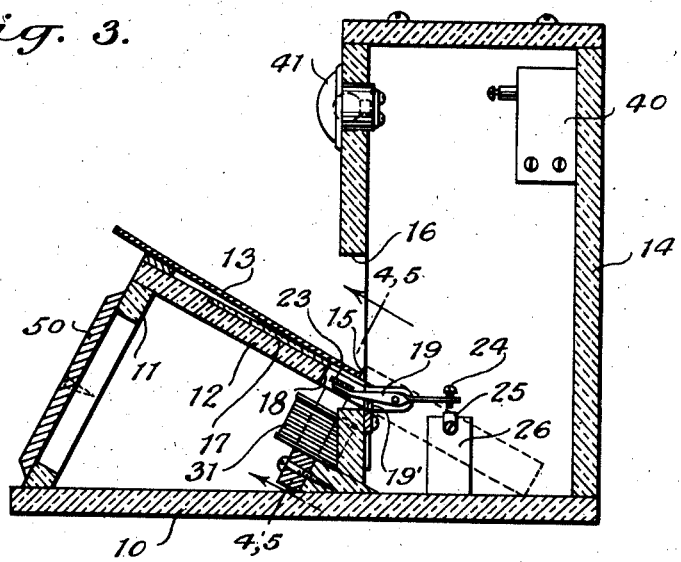
Figure 4:
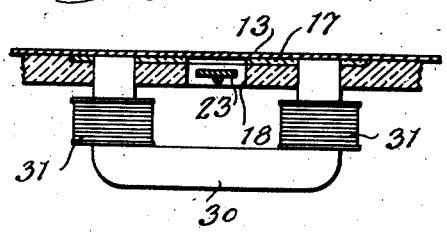
Figure 5:
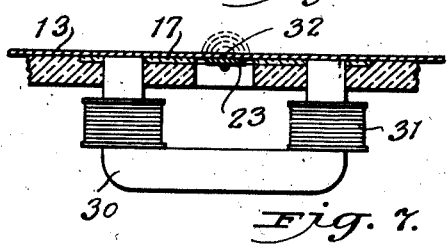
Figure 6:
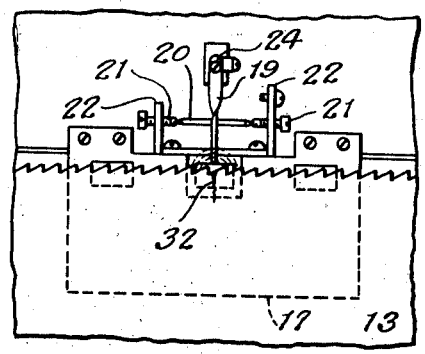
Figure 7:
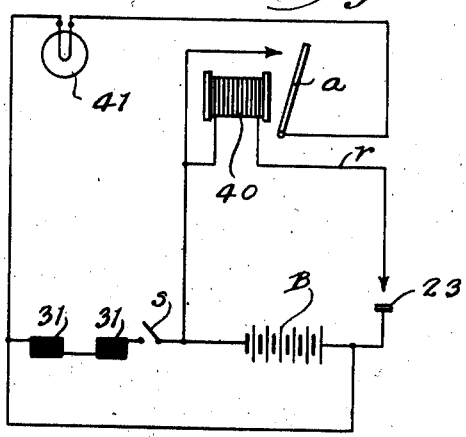

In the accompanying drawings,

Fig. 1 is a top plan view of my improved apparatus for testing saw blades,

Fig. 2 is an enlarged detail plan view of part of the apparatus, parts being broken away and in section for clearness, Fig. 3 is a transverse sectional view on the line 3—3 of Fig. 2, Figs. 4 and 5 are detail sectional views on the line 4, 5—4, 5 of Fig. 3, showing the detecting means in inoperative and operative positions, Fig. 6 is a fragmentary plan view of the detecting means and showing a defective saw blade in position, and Fig. 7 is a wiring diagram.

Referring with particularity to the drawings, I have used the reference numeral 10 to designate the base of my improved apparatus. An inclined brace 11 is secured at its forward edge to the forward edge of the base, extending longitudinally thereof, and supporting the forward upper edge of an inclined platform 12 whereon the saws 13 to be tested are laid. Rising from the rear of the intermediate portion of the base 10 is a housing 14 for the detecting mechanism and the platform 12 is cut away to accommodate the housing. The lower rear edge of the platform rests upon the base and at opposite sides of its cut-away portion, the platform is provided with longitudinally extending shoulders 15 against which the toothed edge of a saw is adapted to abut to retain the saw in proper position for testing.

The housing 14 is formed with a front opening 16 and at that portion of the platform 12 facing the opening, the platform is inlaid with a sheet 17 of insulating material. Platform 12 and sheet 17 are cut away as at 18 to accommodate the forward end of a balanced lever 19 carried by a rock shaft 20, which is delicately mounted in bearings 21 in brackets 22. At its forward end, the lever 19 carries a soft iron armature 23 and at its rear end carries a contact member 24 adapted to make contact with a stationary contact member 25 secured upon a post 26 within the housing 14. Movement of the lever 19 in the opposite direction is limited by the engagement of the lever with a stop 19'.

I provide means for causing a magnetic flux to pass through that portion of the saw blade which is disposed immediately above the cut-away portion 18 of the platform. One convenient means of accomplishing this purpose comprises an electro-magnet consisting of a U-shaped core 30 having its pole pieces secured in the platform and extending through the sheet of insulating material 17 into contact with a saw blade on the platform. Energizing coils 31 on the arms of the core will create a magnetic flux through the core and through that portion of the edge of the saw blade between the poles of the core.

If the toothed edge of the saw blade is homogeneous throughout as in Fig. 4, there will be no leakage of magnetic flux from that portion of the blade adjacent the armature 23. When, however, the toothed edge of the blade is defective or cracked as indicated at 32 in Figs. 5 and 6, false poles will be set up upon opposite sides of the crack and there will be a leakage of magnetic lines of force around the crack, as indicated diagrammatically in Figs. 5 and 6. The tendency of these leaking lines of force to shorten themselves and take the path of least resistance will result in attracting the armature 23 to the saw blade, as seen in Fig. 5, and through the intermediacy of the armature unsuspected flaws in the blade may be readily determined. It will be apparent to anyone familiar with magnetic testing that this movement of the armature may be used to indicate visibly or audibly in any suitable manner that there is a defect in the blade.

For purposes of illustration, I have shown a relay 40 secured within the housing 14 and adapted to operate a signal lamp 41 on the front of the housing. The means by which the armature controls the signal lamp is shown most clearly in the wiring diagram of Fig. 7. In this figure, it will be seen that the armature 23 when it is attracted against the blade closes a relay circuit $r$ through a battery B and that closing of this relay circuit will in turn attract an armature $a$ to light the signal lamp 41. The same battery which is used to energize the relay circuit may also be used in energizing the field producing coils 31, a suitable switch $s$ in the battery line being closed prior to the testing operation.

For convenience in obtaining access to the energizing coils, a removable plate 50 may be secured over an opening in the longitudinally extending forward brace 11. The platform 12, base 10, brace 11 and housing 14 are preferably formed of non-conducting material and the use of the insulating sheet 17 serves to concentrate the magnetic flux passing between the poles of the armature 30 at the toothed edge of the saw blade. The blade may be tested by sliding the same along the platform so that every portion of the toothed edge is moved over the armature 23. Whenever a crack or flaw occurs in the edge of the blade, signal lamp 41 will light.

I am well aware of the fact that compass needles and other magnetized detectors have been previously used for detecting inhomogeneities in magnetizable objects, and wish to call attention to the fact that the detector 23 is of magnetizable material as opposed to magnetized material. The use of the soft iron armature of low reluctance permits the armature to be placed directly in the magnetic field without being affected by the ordinary leakage from a closed magnetic circuit and at the same time, it will be extremely sensitive to magnetic leakage caused by flaws. In speaking of a magnetizable detector in the claims, I refer to a detector of this character, which can be only temporarily magnetized as opposed to a permanently magnetized detector of the compass needle type.

For convenience of illustration and explanation, the apparatus disclosed in this invention has been considered merely as a means for testing saw blades, but it will be quite evident that the invention may have broader applications, and that the particular class of magnetizable material which is tested thereby is immaterial to the invention. Furthermore, the apparatus herein shown is subject to an infinite variety of structural modifications without departing from the invention, and hence I do not wish to limit myself to the precise details set forth, but shall consider myself at liberty to make such changes and alterations as fairly fall within the spirit and scope of the appended claims.

I claim:

1. Apparatus for testing magnetizable objects, comprising an inclined platform for supporting the object to be tested, said platform having a cut-away portion over which that portion of the object to be tested extends, means for magnetizing the object, detecting means movable in the cut-away portion of the platform and sensitive only to magnetic leakage caused by inhomogeneities in the object.

2. Apparatus for testing magnetizable objects, comprising an inclined platform for supporting the object to be tested, said platform having a cut-away portion over which that portion of the object to be tested extends, means for magnetizing the object, detecting means movable in the cut-away portion of the platform and sensitive only to magnetic leakage caused by inhomogeneities in the object, and indicating means controlled by movement of the detecting means.

3. Apparatus for testing magnetized objects, including detecting means comprising an armature of low magnetic reluctance positioned in operative proximity to a magnetized object, a pivoted lever on which said armature is borne, contact making apparatus carried by said lever, and signal means controlled by said contact making apparatus.

4. Apparatus for testing a magnetizable object including means for subjecting the object to the action of magnetic field, a movable magnetizable detector adjacent the object adjusted to be moved only by magnetic leakage due to distortion of the field about said object.

5. Apparatus for testing a magnetizable object comprising means for producing a magnetic field about the object, a movable magnetizable detector in the field sensitive only to magnetic leakage from said object, and means for indicating movement of the detector caused by said magnetic leakage.

6. Apparatus for testing a magnetizable object comprising means for producing a magnetic field about the object, a magnetizable detector of low magnetic reluctance mounted to move toward and from said object, and means for indicating movement of the detector caused by distortions in the field.

7. Apparatus for testing a magnetizable object comprising means for producing a magnetic field about the object, a soft iron detector in the field, a mounting for the detector permitting movement of the detector toward and from said object, and means for indicating such movement of the detector caused by distortions in the field.

8. Apparatus for testing a magnetizable object comprising magnetizing means having exposed flux conducting portions positioned for engagement with said object, and flux leakage detecting means including a movable member having a flux sensitive portion positioned in such proximity to the path of said object that flux leakage from said object will be effective to move said movable member.

ALFRED SWING.